US009868337B2

(12) United States Patent
Kim et al.

(10) Patent No.: US 9,868,337 B2
(45) Date of Patent: Jan. 16, 2018

(54) METHOD FOR DEHYDRATING EVAPORATOR OF AIR CONDITIONER OF VEHICLE

(75) Inventors: Tae Han Kim, Seoul (KR); Jun Kyu Park, Hwaseong-si (KR); Moo Yong Kim, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 827 days.

(21) Appl. No.: 13/605,605

(22) Filed: Sep. 6, 2012

(65) Prior Publication Data
US 2013/0145647 A1 Jun. 13, 2013

(30) Foreign Application Priority Data

Dec. 9, 2011 (KR) ........................ 10-2011-0131843

(51) Int. Cl.
F25D 21/00 (2006.01)
F25D 21/06 (2006.01)
F25B 19/00 (2006.01)
B60H 1/32 (2006.01)
B60H 3/00 (2006.01)
F24F 13/22 (2006.01)
B60H 1/00 (2006.01)

(52) U.S. Cl.
CPC ....... B60H 3/0085 (2013.01); B60H 1/00778 (2013.01); B60H 1/004 (2013.01); B60H 1/00785 (2013.01); F24F 13/22 (2013.01); F24F 13/222 (2013.01); F24F 2013/228 (2013.01); F25B 2600/23 (2013.01); F25B 2700/02 (2013.01); F25B 2700/15 (2013.01)

(58) Field of Classification Search
CPC ...... B60K 6/42; B60L 11/123; B60L 11/1861; B60H 1/00385; B60H 1/004; B60H 1/00785; F25B 2700/02; F25B 2700/15; F25B 2700/23; F24F 2013/22; F24F 2013/221; F24F 2013/222; F24F 2013/228
USPC .......... 62/155, 157, 231, 239, 243, 150, 272
See application file for complete search history.

(56) References Cited

U.S. PATENT DOCUMENTS

| 5,701,752 A * | 12/1997 | Tsunokawa et al. ........... 62/183 |
| 5,873,256 A * | 2/1999 | Denniston .......................... 62/91 |
| 2005/0045322 A1 * | 3/2005 | Yoshida et al. ............... 165/202 |
| 2005/0252983 A1 * | 11/2005 | Acker, Jr. .................. 236/44 R |

(Continued)

FOREIGN PATENT DOCUMENTS

| CN | 101574915 A | 11/2009 |
| CN | 101898500 A | 12/2010 |

(Continued)

Primary Examiner — Frantz Jules
Assistant Examiner — Daniel C Comings
(74) Attorney, Agent, or Firm — Morgan, Lewis & Bockius LLP

(57) ABSTRACT

A method for dehydrating an evaporator of an air conditioner of a vehicle is provided to drive a blower motor depending on the humidity of the evaporator while monitoring a dry state of the evaporator, thus allowing the evaporator to be appropriately dried and preventing a problem from being caused by the discharge of a battery, therefore minimizing an odor generated by the air conditioner of the vehicle owing to effective drying of the evaporator of the air conditioner, and consequently considerably improving the marketability of the vehicle.

5 Claims, 4 Drawing Sheets

(56) References Cited

U.S. PATENT DOCUMENTS

| | | | |
|---|---|---|---|
| 2007/0137238 A1* | 6/2007 | Hu | 62/277 |
| 2008/0066477 A1* | 3/2008 | Aoki et al. | 62/150 |
| 2009/0064695 A1* | 3/2009 | Kojima | 62/230 |
| 2009/0133417 A1* | 5/2009 | Egawa | B60H 1/00735 62/132 |

FOREIGN PATENT DOCUMENTS

| | | |
|---|---|---|
| JP | 5-319077 A | 12/1993 |
| JP | 2005-67523 A | 3/2005 |
| KR | 2003-0026466 A | 4/2003 |
| KR | 2003-0032378 A | 4/2003 |
| KR | 10-2004-0015919 A | 2/2004 |
| KR | 10-2005-0023480 A | 3/2005 |
| KR | 10-0726225 B1 | 6/2007 |
| KR | 10-2008-0010651 A | 1/2008 |
| KR | 10-2011-0126270 A | 11/2011 |
| WO | WO 2006/112548 A1 | 10/2006 |

* cited by examiner

METHOD FOR DEHYDRATING EVAPORATOR OF AIR CONDITIONER OF VEHICLE

CROSS-REFERENCE TO RELATED APPLICATIONS

The present application claims priority to Korean Patent Application No. 10-2011-0131843 filed on Dec. 9, 2011, the entire contents of which is incorporated herein for all purposes by this reference.

BACKGROUND OF THE INVENTION

Field of the Invention

The present invention relates generally to a method for dehydrating an evaporator of an air conditioner of a vehicle and, more particularly, to an evaporator dehydrating method intended to forcibly remove water from an evaporator of an air conditioner so as to prevent the evaporator from giving off an odor.

Description of Related Art

When a vehicle has been used for a lengthy period of time, an air conditioner of the vehicle may give off an odor. The odor is mainly caused by the adsorption and propagation of organic matter that may produce an odor and water on a surface of an evaporator constituting the air conditioner.

Particularly, if the vehicle is parked for a lengthy period of time after the air conditioner was operated and then an engine is turned off, condensed water produced on the surface of the evaporator stays between cooling fins of the evaporator for a lengthy period of time, so that it provides an environment suitable for propagation of microorganisms or the like. Such a situation becomes more serious as a period when the vehicle is used increases.

In order to solve the problems occurring in the prior art, there has been proposed a method for mounting a moisture purge system (MPS) on a vehicle to forcibly operate a blower motor and dry the evaporator after the engine is turned off and a passenger gets out of the vehicle, thus removing the cause of an odor. This method is considerably advantageous to remove the odor.

However, the above-mentioned MPS is not universally available, because there is no method for checking whether the conventional MPS sufficiently dries the evaporator and a battery may be discharged if the blower motor is driven for a lengthy period of time with the engine turned off.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for dehydrating an evaporator of an air conditioner of a vehicle, which is intended to drive a blower motor depending on the humidity of the evaporator while monitoring a dry state of the evaporator, thus allowing the evaporator to be appropriately dried and preventing a problem from being caused by the discharge of a battery, therefore minimizing an odor generated by the air conditioner of the vehicle owing to effective drying of the evaporator of the air conditioner, and consequently considerably improving the marketability of the vehicle.

In an aspect of the present invention, a method for dehydrating an evaporator of an air conditioner in a vehicle, may include a) determining whether a voltage of a battery is equal to or larger than a predetermined reference voltage when an engine is turned off, b) determining whether the air conditioner is operated or not before the engine is turned off, c) driving a blower motor and sensing humidity of blown air using a humidity sensor, when it is determined that the voltage of the battery is equal to or larger than the reference voltage and the air conditioner is operated, d) determining whether the humidity sensed at c) step is equal to or larger than a predetermined reference humidity, e) setting a mode change period between a defog mode and a vent mode and a drive voltage of the blower motor, depending on the sensed humidity, when the sensed humidity is equal to or larger than the reference humidity at d) step, f) changing an air conditioning mode into the vent mode, and applying the set drive voltage to the blower motor, depending on conditions set at e) step, thus drying the evaporator, and g) determining whether the mode change period between the defog mode and the vent mode is reached during f) step, and converting the vent mode into the defog mode when the mode change period is reached, thus circulating a control to c) step.

The method may further include converting the air conditioning mode of the vehicle into the defog mode and converting a temp door into a maximum cooling state, before the c) step.

At c) step, the humidity of the air blown through a defog vent towards a windshield glass is measured using the humidity sensor mounted on the windshield glass.

At e) step, the mode change period is set to increase duration of the vent mode as the sensed humidity increases, and the drive voltage of the blower motor is set to be increased as the sensing humidity increases.

The method may further include determining whether the voltage of the battery is equal to or larger than the reference voltage between f) step and g) step, and terminating the control when the voltage of the battery is less than the reference voltage.

The evaporator dehydrating method according to an exemplary embodiment of the present invention is advantageous in that it is intended to drive a blower motor depending on the humidity of the evaporator while monitoring a dry state of the evaporator, thus allowing the evaporator to be appropriately dried and preventing a problem from being caused by the discharge of a battery, therefore minimizing an odor generated by the air conditioner of the vehicle owing to effective drying of the evaporator of the air conditioner, and consequently considerably improving the marketability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
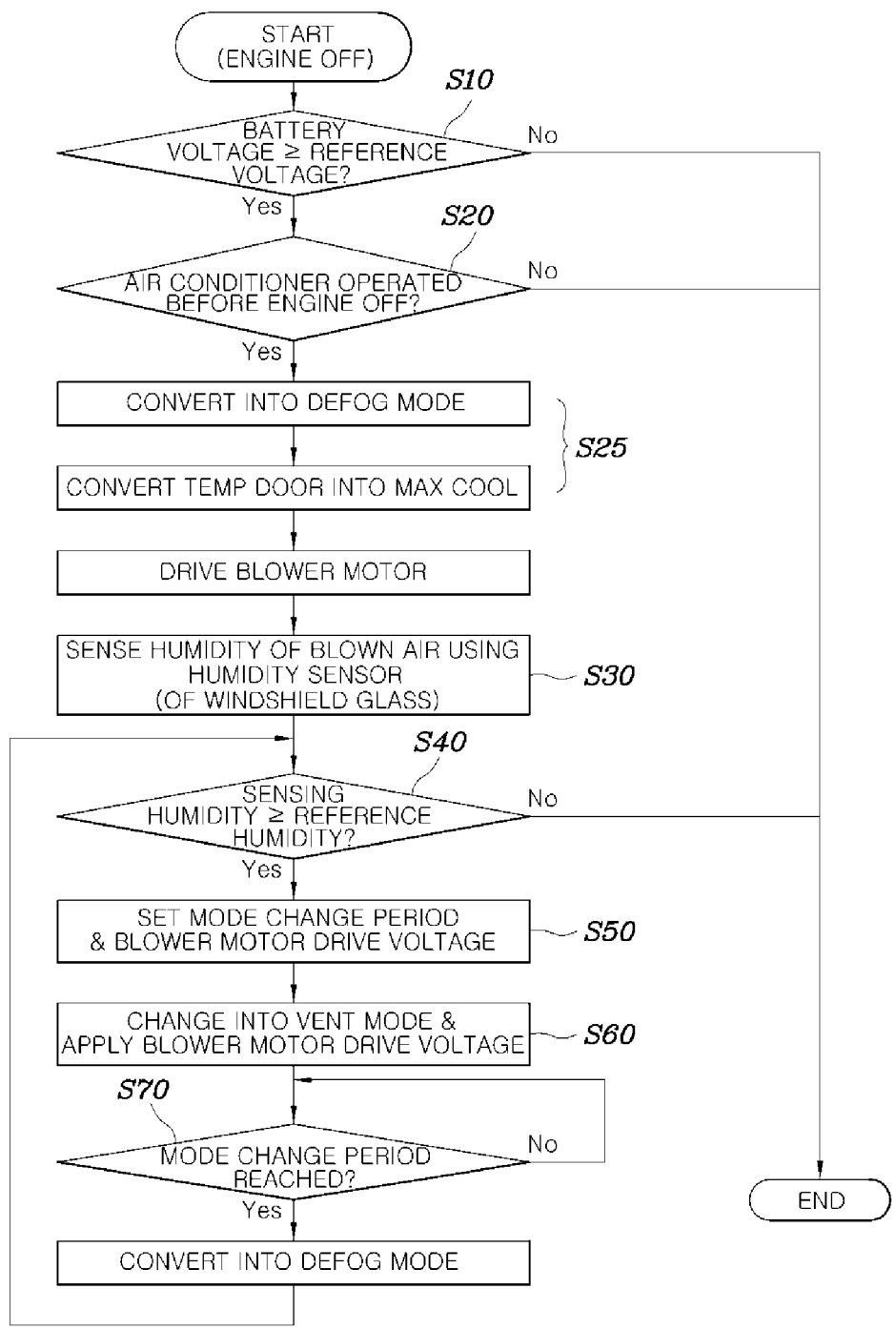
FIG. 1 is a flowchart illustrating a method for dehydrating an evaporator of an air conditioner of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a method for dehydrating an evaporator of an air conditioner of a vehicle according to an exemplary embodiment of the present invention includes a battery determining step S10, an air conditioner checking step S20, a humidity measuring step S30, a dryness determining step S40, a control setting step S50, a drying step S60, and a period determining step S70. At the battery determining step S10, it is determined whether the voltage of a battery is a predetermined reference voltage or more, when an engine is turned off. At the air conditioner checking step S20, it is determined whether the air conditioner is operated or not, before the engine is turned off. At the humidity measuring step S30, when it is determined that the battery voltage is the reference voltage or more and the air conditioner is operated, a blower motor is driven and the humidity of blown air is sensed by a humidity sensor. At the dryness determining step S40, it is determined whether the humidity sensed at the humidity measuring step S30 is a predetermined reference humidity or more. When it is determined at the dryness determining step S40 that the sensing humidity is the reference humidity or more, a change period between a defog mode and a vent mode and a drive voltage of the blower motor are set depending on the sensing humidity, at the control setting step S50. At the drying step S60, an air conditioning mode is changed into the vent mode and the set drive voltage is applied to the blower motor depending on conditions set at the control setting step S50, thus drying the evaporator. When it is determined that the change period between the defog mode and the vent mode is reached during the drying step S60, the vent mode is converted into the defog mode and a control circulates to the humidity sensing step, at the period determining step S70.

That is, when the engine is turned off, the voltage of the battery is inspected to check whether energy for drying the evaporator of the air conditioner remains in the battery. If the air conditioner was operated, the blower motor is driven and the humidity contained in the blown air is sensed, so that the humidity condensed on a surface of the evaporator is checked, and thereby the blower motor is driven depending on the checked result to dry the evaporator. As a consequence, the evaporator is dried to a proper level while the discharge of the battery is prevented, thus preventing the evaporator of the air conditioner from generating the odor in the vehicle.

Before the first humidity measuring step S30, a measurement preparing step S25 is further carried out to convert the air conditioning mode of the vehicle into the defog mode and to convert a temp door to a maximum cooling state. At the humidity measuring step S30, the humidity of air blown through a defog vent towards a windshield glass is preferably measured using the humidity sensor mounted on a windshield glass.

This enables the use of the existing humidity sensor mounted on the windshield glass while forming a portion of an auto defog system, instead of configuring the humidity sensor for implementing the present invention by mounting an additional sensor on another portion.

Figure 2:
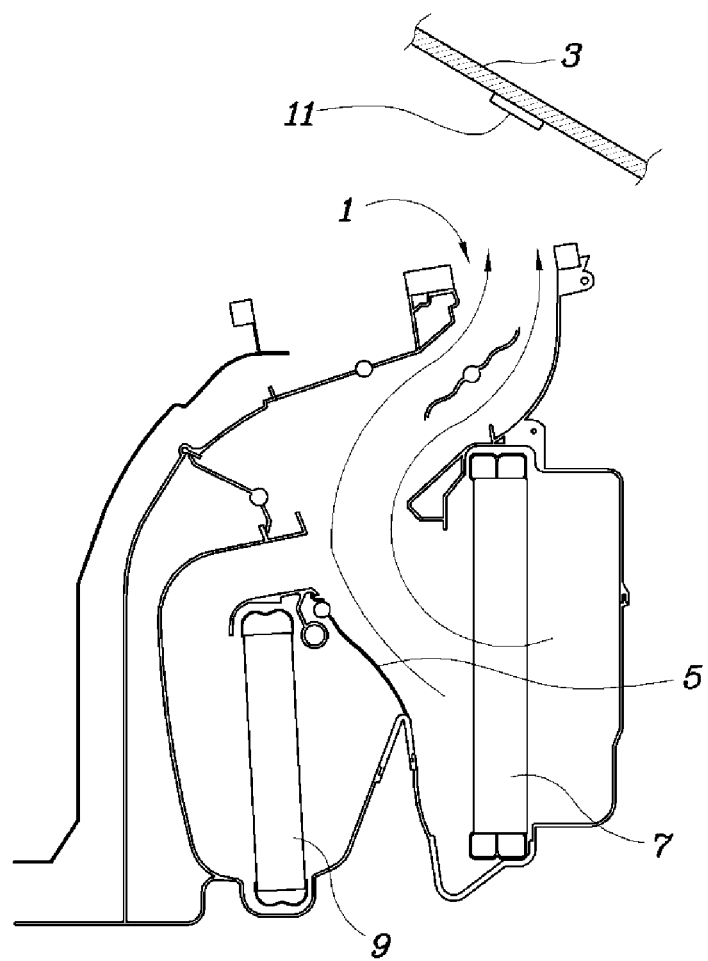
FIG. 2 is a view illustrating a humidity measuring step of the present invention.

That is, as shown in FIG. 2, since the humidity sensor 11 uses the sensor that is mounted on the windshield glass 3 to measure the humidity contained in the air discharged from the defog vent 1 so as to perform a defog function in the defog mode, the air conditioning mode is previously converted into the defog mode at the measurement preparing step S25 if the air conditioning mode is not the defog mode.

Further, the reason why the temp door 5 is at the maximum cooling state is because the air blown by the blower motor passes through the evaporator 7 and then is directly discharged to the defog vent 1 without passing through a heater core 9 as shown in FIG. 2, thus preventing water from being removed from the air by latent heat of the heater core and making it possible to easily check the precise humidity of the evaporator 7.

Figure 3:
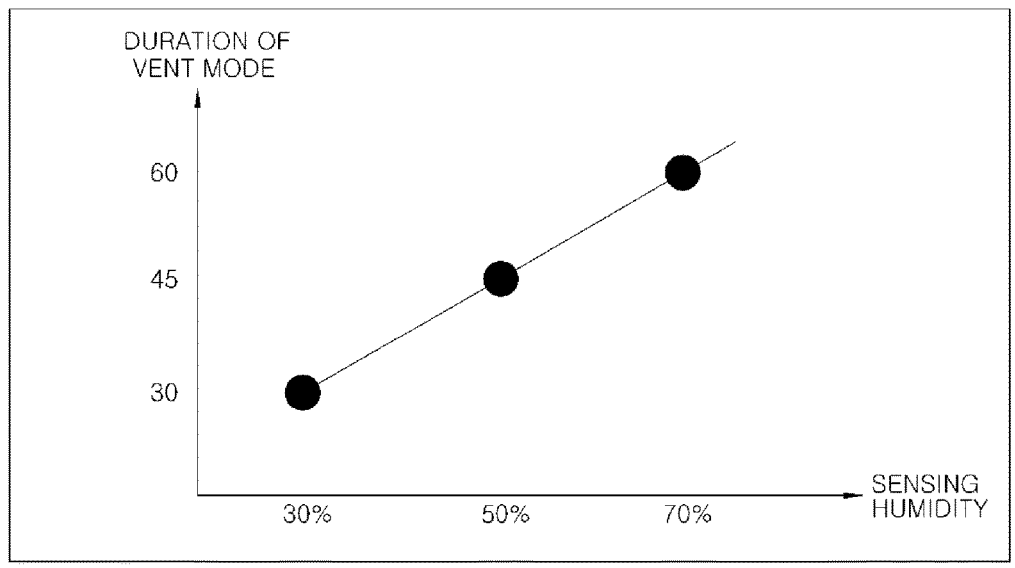
FIG. 3 is a graph illustrating the setting of a period of changing an air conditioning mode depending on sensing humidity at a control setting step of the present invention.
Figure 4:
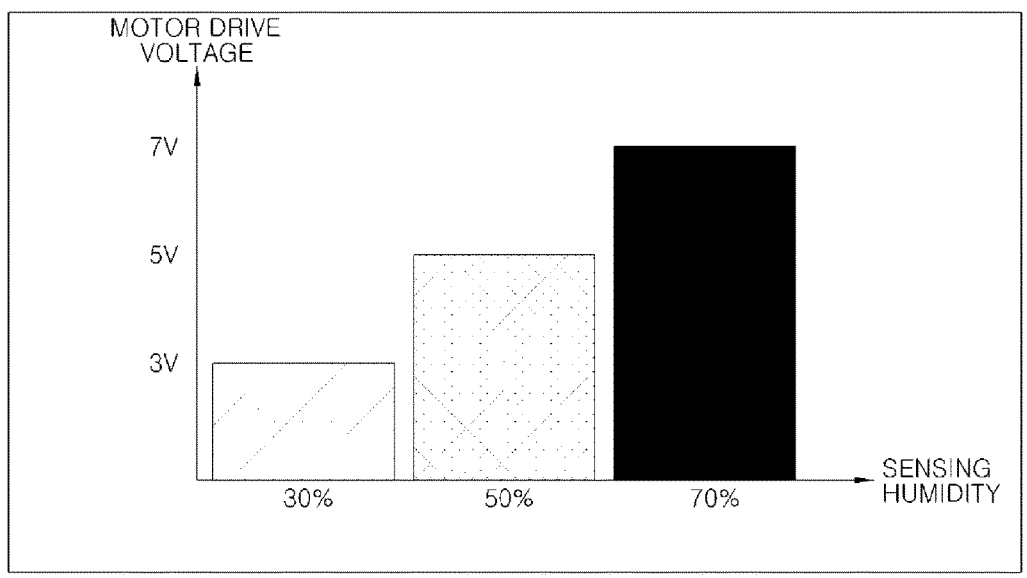
FIG. 4 is a graph illustrating the setting of a drive voltage of a blower motor depending on sensing humidity at the control setting step of the present invention.

At the control setting step S50, as shown in FIGS. 3 and 4, the mode change period is set so that the duration of the vent mode increases as the sensing humidity increases, and the drive voltage of the blower motor is set to be high as the sensing humidity increases.

That is, the higher the sensing humidity is, the longer the time when the vent mode is maintained and then is converted into the defog mode is, thus allowing a drying operation to be performed for a relatively longer time in the vent mode. Thereafter, the vent mode is converted into the defog mode to periodically check the dry state of the evaporator. As the sensing humidity is high, the drive voltage of the blower motor is also high, thus providing a larger volume of air for higher humidity and thereby achieving a rapid drying operation.

Herein, the reason why the drying step S60 is performed in the vent mode as such is as follows, resistance of air discharged from the air conditioner is typically small in the vent mode, so that it is possible to form more air flow assuming that the same energy is consumed in the vent mode, and thus it is advantageous to dry the evaporator while reducing power consumption of the battery.

Figure 5:
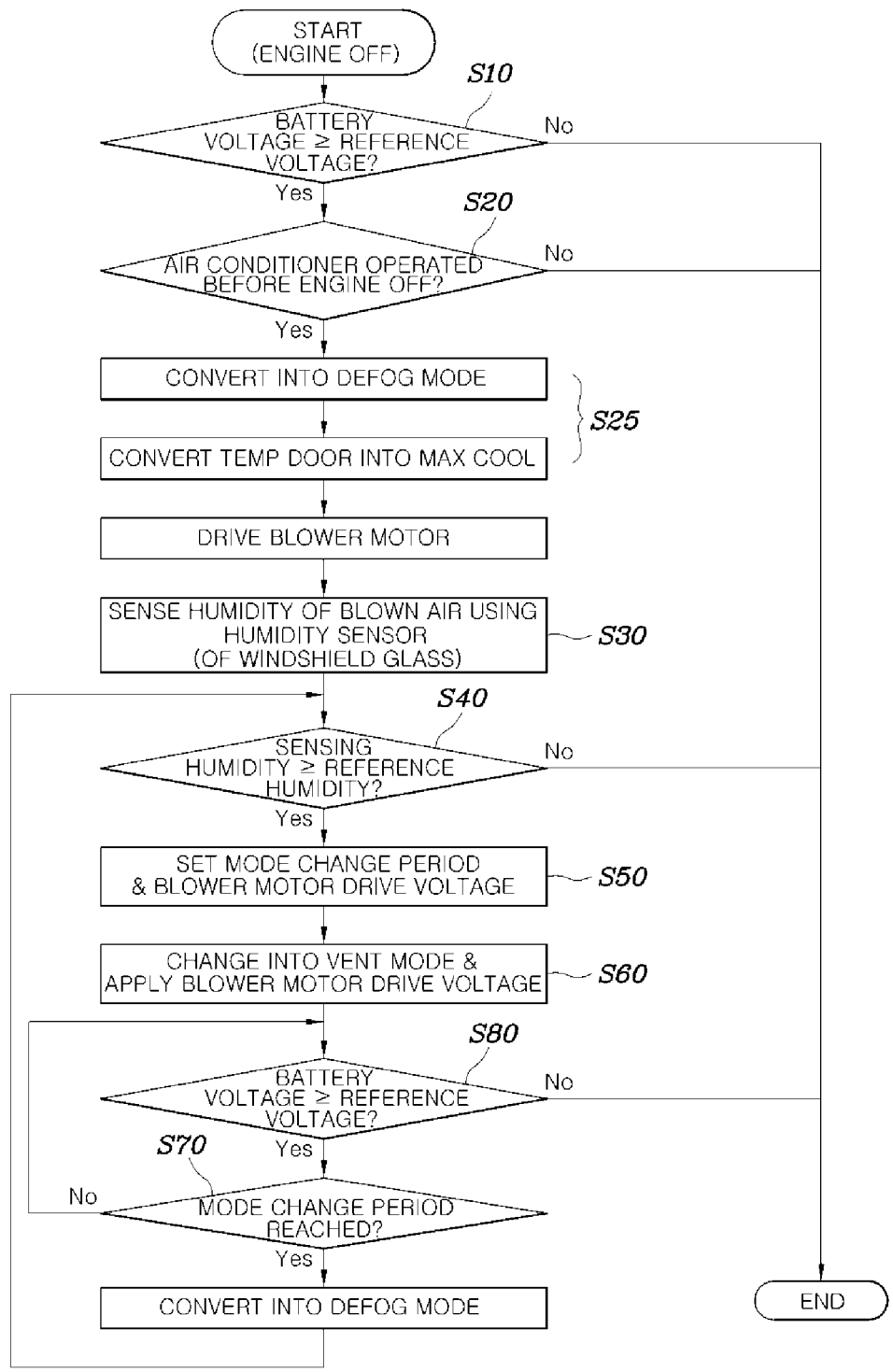
FIG. 5 is a flowchart illustrating another embodiment of the present invention.

Meanwhile, in the above-mentioned embodiment, the voltage of the battery is determined only once, before the drying operation of the evaporator starts. In this case, a change in the situation, for example, a drying step S60 that requires a longer time than that of being expected in an initial stage, may cause a drop in the voltage of the battery at the drying step S60. Thus, the discharge possibility of the battery affecting the startability of the engine cannot be completely excluded. In order to compensate the problem, the method may further include a battery monitoring step S80 of determining whether the voltage of the battery is a reference voltage or more during the drying step S60 and terminating the control if the voltage of the battery is less than the reference voltage. Such an exemplary embodiment is illustrated in FIG. 5.

For reference, the reference voltage at the battery determining step S10 may be set to be equal to or different from the reference voltage at the battery monitoring step S80. Typically, the reference voltage at the battery determining step S10 may be previously properly set based on an experiment in consideration of the power of the battery consumed to dry the evaporator 7. The reference voltage at the battery monitoring step S80 may be set to a proper value in consideration of maximum power that is to be consumed for one period of the mode change period which is set at the control setting step S50.

In addition, reference humidity at the humidity measuring step S30 is a reference indicating that the humidity of the blown air depending on the water of the evaporator 7 requires the drying operation, and is also previously set based on many experiments.

As described above, the present invention provides a method for dehydrating an evaporator of an air conditioner of a vehicle, which allows the evaporator to be dried to a proper level while continuously monitoring the dry state of the evaporator without the necessity of worrying about the discharge of a battery.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for dehydrating an evaporator of an air conditioner in a vehicle, comprising:
    a) determining, by a controller of the air conditioner, whether a voltage of a battery is equal to or larger than a predetermined reference voltage after an engine is turned off;
    b) checking, by the controller, between a time when the engine is turned off and a time when the engine is restarted, whether the evaporator of the air conditioner has been turned on or not before the engine is turned off;
    c) driving, by the controller, between the time when the engine is turned off and the time when the engine is restarted a blower motor and sensing humidity of blown air using a humidity sensor, when it is determined, by the controller, that the voltage of the battery is equal to or larger than the predetermined reference voltage in the step a) and when it is checked that the evaporator of the air conditioner has been turned on before the time when the engine is turned off in the step b);
    d) determining, by the controller, whether the humidity sensed at the step c) is equal to or larger than a predetermined reference humidity;
    e) setting, by the controller, a mode change period between a defog mode and a vent mode and a drive voltage of the blower motor, depending on the sensed humidity, when the sensed humidity is equal to or larger than the predetermined reference humidity at the step d);
    f) changing, by the controller, an air conditioning mode into the vent mode, and applying the set drive voltage to the blower motor, depending on conditions set at the step e), thus drying the evaporator; and
    g) determining, by the controller, whether the mode change period between the defog mode and the vent mode is reached during the step f), and converting the vent mode into the defog mode when the mode change period is reached, thus circulating a control to the step c).

2. The method as set forth in claim 1, further including: converting the air conditioning mode of the vehicle into the defog mode and converting a temp door into a maximum cooling state, before the step c).

3. The method as set forth in claim 1, wherein, at the step c), the humidity of the air blown through a defog vent towards a windshield glass is measured using the humidity sensor mounted on the windshield glass.

4. The method as set forth in claim 1, wherein, at the step e), the mode change period is set to increase duration of the vent mode as the sensed humidity increases, and the drive voltage of the blower motor is set to be increased as the sensed humidity increases.

5. The method as set forth in claim 1, further including: determining whether the voltage of the battery is equal to or larger than the reference voltage between the step f) and the step g), and terminating the control when the voltage of the battery is less than the reference voltage.

* * * * *